(12) United States Patent
Ranjan et al.

(10) Patent No.: US 7,941,549 B2
(45) Date of Patent: May 10, 2011

(54) PROTOCOL EXCHANGE AND POLICY ENFORCEMENT FOR A TERMINAL SERVER SESSION

(75) Inventors: Shivesh Ranjan, Hyderabad-32 (IN); Sudarshan Yadav, Hyderabad-32 (IN)

(73) Assignee: Microsoft Corporation, Redmond, WA (US)

( * ) Notice: Subject to any disclaimer, the term of this patent is extended or adjusted under 35 U.S.C. 154(b) by 187 days.

(21) Appl. No.: 12/211,612

(22) Filed: Sep. 16, 2008

(65) Prior Publication Data

US 2010/0070634 A1    Mar. 18, 2010

(51) Int. Cl.
*G06F 15/16* (2006.01)
(52) U.S. Cl. ......... 709/228; 709/203; 709/227; 709/229
(58) Field of Classification Search .................. 709/221, 709/223, 226, 203, 227–230; 370/356, 401, 370/431
See application file for complete search history.

(56) References Cited

U.S. PATENT DOCUMENTS

| | | | | |
|---|---|---|---|---|
| 6,105,068 A * | 8/2000 | Naudus | ......... | 709/228 |
| 6,915,431 B1 * | 7/2005 | Vasudevan et al. | ........... | 713/171 |
| 7,013,338 B1 * | 3/2006 | Nag et al. | ....... | 709/226 |
| 7,080,404 B2 | 7/2006 | Abdo et al. | | |
| 7,154,907 B2 * | 12/2006 | Poikselka et al. | ............. | 370/465 |
| 7,342,906 B1 * | 3/2008 | Calhoun | ....... | 370/338 |
| 7,640,348 B2 * | 12/2009 | Atwal et al. | ................. | 709/229 |
| 2003/0172303 A1 * | 9/2003 | Adusumilli | .................. | 713/201 |
| 2004/0030790 A1 * | 2/2004 | Le et al. | ......... | 709/230 |
| 2005/0193103 A1 * | 9/2005 | Drabik | ........ | 709/221 |
| 2005/0198380 A1 * | 9/2005 | Panasyuk et al. | ............. | 709/239 |
| 2007/0038762 A1 * | 2/2007 | Moerdijk | ...................... | 709/229 |
| 2007/0061878 A1 | 3/2007 | Hagiu et al. | | |
| 2007/0174410 A1 | 7/2007 | Croft et al. | | |
| 2007/0233869 A1 | 10/2007 | Jodh et al. | | |
| 2007/0277231 A1 | 11/2007 | Medvinsky et al. | | |

OTHER PUBLICATIONS

Shinder, T., "Windows Server 2008 TS Gateway Server Step-By-Step Setup Guide," http://download.microsoft.com/download/b/b/5/bb50037f-e4ae-40d1-a898-7cdfcf0ee9d8/WS08_STEP_BY_STEP_GUIDE/WS08TSGatewayServerStep-By-StepSetupGuide_En.doc, Apr. 8, 2008, 1-29.
"Terminal Services Gateway (TS Gateway)," http://technet2.microsoft.com/windowsserver2008/en/library/9da3742f-699d-4476-b050-c50aa14aaf081033.mspx?mfr=true, Sep. 24, 2007, 1-7.
"Description of the Remote Desktop Connection 6.1 Client Update for Terminal Services," http://support.microsoft.com/kb/951616, 2008, 1-5.
"Configuring the Windows Server 2008 Terminal Services Gateway (Part 2)," http://www.windowsecurity.com/articles/Configuring-Windows-Server-2008-Terminal-Services-Gateway-Part2.html, Dec. 2007, 1-71.
"RDP Support in Windows Embedded CE," http://msdn.microsoft.com/en-us/library/aa913400.aspx, Mar. 25, 2008, 1-4.

\* cited by examiner

*Primary Examiner* — Joshua Joo
(74) *Attorney, Agent, or Firm* — Woodcock Washburn LLP (57) ABSTRACT

Example embodiments of the present disclosure provide techniques for performing multiple protocol exchanges over a single socket connection, one preceding another, in order to provide a platform for policy exchange between terminal servers and a gateway. The protocol exchanges may occur without using additional ports while ensuring that the terminal server state is restored to the previous state. In an embodiment, such a method may adhere to terminal server security levels and perform an exchange with the terminal servers by replicating remote access security layer exchanges and authenticating the gateway to the terminal server.

18 Claims, 11 Drawing Sheets

PROTOCOL EXCHANGE AND POLICY ENFORCEMENT FOR A TERMINAL SERVER SESSION

BACKGROUND

A terminal services gateway (TSG) is a server that may allow authenticated and authorized remote desktop clients to connect to terminal services resources inside a network, such as a corporate network. The clients may use protocols such as the Remote Desktop Protocol (RDP) to connect to a resource within the corporate network through the gateway. When a remote desktop client connects to a terminal server via a terminal services gateway, the gateway typically opens a socket connection with the terminal server and redirects all client traffic to a port normally reserved for such purposes. The terminal services gateway also typically exchanges gateway and remote access policies for the connection.

Once the client and terminal server remote access protocol exchange commences, the terminal services gateway normally cannot interfere with the exchange nor can it look into the encrypted exchange to verify if the client is enforcing the agreed upon policies. A rogue client can thus potentially bypass the established policies sent to the client resulting in a potential security breach. Furthermore, terminal servers typically have only a single port open on their firewall, and thus it is not practical to open another port on the terminal servers for security reasons. Finally, the terminal server typically is not be able to differentiate between connections coming via the terminal services gateway from those coming from within the corporate network.

SUMMARY

In various embodiments, a method and system is disclosed for providing an infrastructure for enabling policy enforcement in a remote access session with a terminal server by performing multiple protocol exchanges with the terminal server over the remote access port. In one embodiment, a multi-protocol infrastructure is provided so that the gateway may perform an initial secure and authenticated exchange with the terminal server on the remote access port prior to establishing the remote access protocol. Such an initial protocol may replicate the remote access protocol's security layer exchange in order to establish secure and authenticated communication between the terminal services gateway and the terminal server and exchange the gateway's policies with the terminal server securely. Once the exchange is complete, the method may tear down the gateway to terminal server high level connection while preserving the socket connection such that the client's remote access traffic can be seamlessly exchanged with the terminal server using the same connection context. Using such a multi-protocol infrastructure, additional protocol exchanges may be implemented prior to the remote access protocol.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol) to an application at the terminal server. The application processes the input as if the input was entered at the terminal server. The application generates output in response to the received input and the output is transferred over the network to the client computer system. The client computer system presents the output data. Thus, input is received and output presented at the client computer system, while processing actually occurs at the terminal server.

In most, if not all terminal server environments, input data (entered at a client computer system) typically includes mouse and keyboard data representing commands to an application and output data (generated by an application at the terminal server) typically includes video data for display on a video output device. Many terminal server environments also include functionality that extended protocols (e.g., developed to transfer input and output data) to transfer other types of data.

For example, virtual channels can be used to extend the RDP protocol by allowing plug-ins to transfer data over an RDP connection. Many such extensions exist. For example, features such as printer redirection, clipboard redirection, port redirection, etc., use virtual channel technology. Thus, in addition to input and output data, there may be many virtual channels that need to transfer data. Accordingly, at least from time to time, there may be requests to transfer output data and one or more channel requests to transfer other data contending for available network bandwidth.

Figure 2:
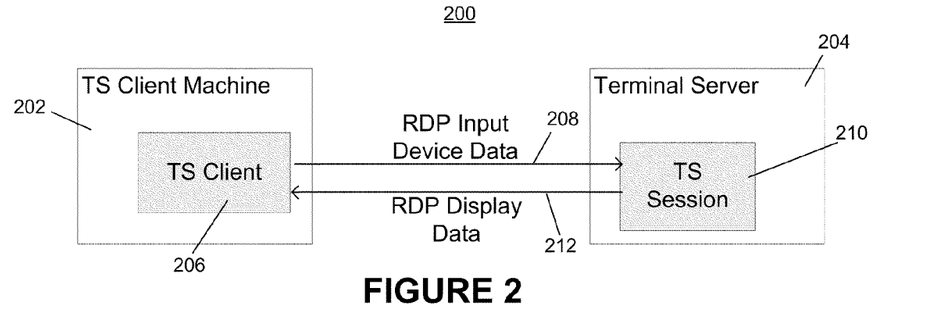
FIG. 2-4 depict an operational environment for practicing aspects of the present disclosure.

FIG. 2 shows an implementation 200 enabling terminal services. A TS client machine 202 and a TS 204 communicate using RDP. The TS client machine 202 runs a TS client process 206 that sends RDP input device data 208, such as for example keyboard data and mouse click data, to a TS session 210 that has been spawned on the TS and receives RDP display data 212, such as user interface graphics data. Generally, the TS client process 206 is a thin client process and most processing is provided on the TS 204.

Figure 3:
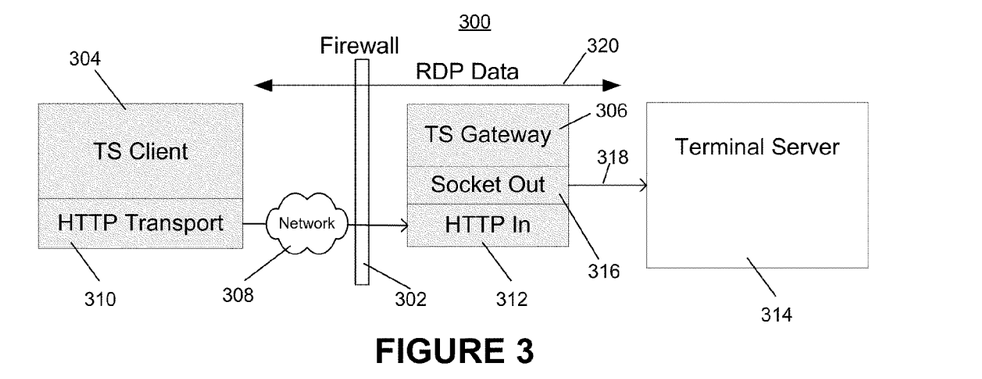

FIG. 3 shows an implementation 300 enabling terminal services through a firewall 302. A remote TS client 304 connects to a TSG 306 over a network 308. An HTTP transport process 310 on the TS client and an HTTP process 312 on the TSG 306 facilitate communication through the firewall 302. The HTTP transport process 310 wraps data for the TSG 306, such as for example Remote Procedure Call ("RPC") data or RDP data, in HTTPS headers. The TSG 306 may connect to a TS 314 via a socket out process 316 over a socket connection 318 to the TS 314. Once the TS client 304 is authenticated and a connection is established, RDP data 320 may be passed back and forth between the TS client 304 and the TS 314.

Figure 4:
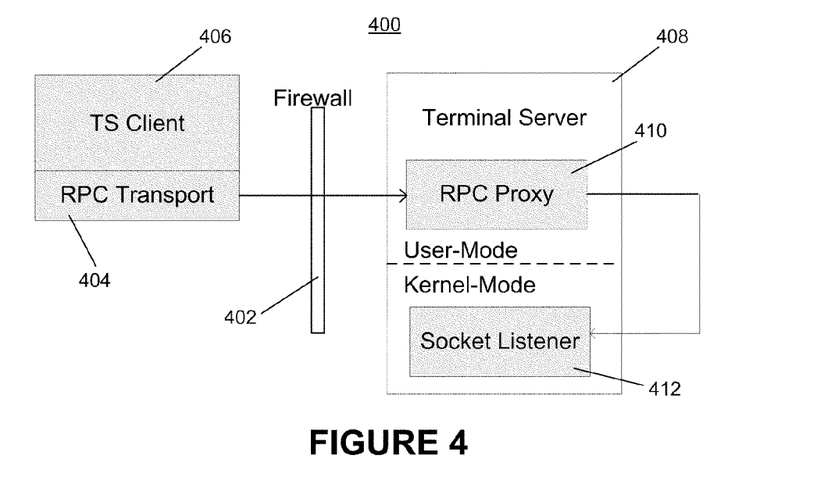

FIG. 4 shows a generalized example of an implementation 400, wherein an existing RPC/HTTP (remote procedure call/hypertext transport protocol) proxy is leveraged, thereby providing a terminal services protocol, such as for example RDP, over an RPC/HTTP connection through a firewall 402. The architecture of the implementation illustrates that by wrapping the RDP protocol within RPC calls, an existing RPC-based proxy can be advantageously utilized. In particular, an RPC Transport Plug-In 404 on the TS client 406 wraps an RDP stream providing communication between the TS client 406 and the terminal server 408 within an RPC protocol. This facilitates utilization of an RPC-based proxy, thereby enabling firewall navigation. The RPC-based proxy 410, which may run in a user-mode on the TS, can forward received data to a socket listener 412, which may run in kernel-mode on the TS.

In some cases, security measures may prevent remote users from connecting to internal network resources across firewalls and network address translators (NATs). This is because in many cases a single port is reserved for remote connections. For example, port 3389 is typically used for RDP connections, and may further be blocked for network security purposes at the firewalls. The gateway may transmit RDP traffic to another port, for example port 443, by using an HTTP Secure Sockets Layer/Transport Layer Security (SSL/TLS) tunnel. Because many corporations open port 443 to enable Internet connectivity, the gateway may take advantage of this network design to provide remote access connectivity across multiple firewalls.

A Gateway Manager may allow the configuration of authorization policies to define desirable conditions for remote users to meet in order to connect to internal corporate network resources. For example, an administrator may specify which users may connect to network resources, what network resources the users may connect to, and whether clients need to use smart card authentication, password authentication, or other authentication means.

In various embodiments a terminal services remote application may allow users on client computers to connect to a remote computer and run programs that are installed on the remote computer. For example, employees may be able to connect to a remote computer at a workplace site and subsequently run a word processing program on that computer. An administrator will typically publish the available programs that remote users may access.

As discussed above, clients may use a remote protocol such as Remote Desktop Protocol (RDP) to connect to a resource using terminal services. When a remote desktop client connects to a terminal server via a terminal server gateway, the gateway may open a socket connection with the terminal server and redirect client traffic on the RDP port or a port dedicated to remote access services. The gateway may also perform certain gateway specific exchanges with the client using a terminal server gateway protocol transmitted over HTTPS. Using the terminal server gateway protocol, the gateway may exchange gateway and remote access protocol related policies for the connection. An example of a gateway specific policy is a service message capability exchange, while an example for a remote access protocol policy is a device redirection policy. Device redirection allows users to redirect certain devices attached to the client session to the terminal server session.

Once the client and terminal server remote access exchange commences, the gateway typically has no means to interfere with the exchange or determine the contents of the encrypted exchange to verify whether the client is enforcing the agreed upon policies. Thus, a rogue client can potentially bypass gateway policies sent to the client resulting in a potential security breach. For example, to bypass a device redirection policy, a rogue client can choose to ignore gateway specific policies and request a redirection of devices that are normally prohibited by the gateway. The gateway merely acts as a tunnel that receives client packets on one channel and passes them to the terminal server on another, and thus will no longer access the content of messages once the remote session commences.

As discussed above, terminal servers typically have only one port available for remote access services. In some embodiments, only port 3389 is open on the firewall, and thus it is not practical to open another port on the terminal servers for security reasons. Nevertheless, terminal servers may need to enforce authentication and encryption for exchanges that they perform over the remote access port. Finally, it can be seen that a terminal server does not differentiate between connections coming via the gateway and those coming directly within the network. Those skilled in the art will appreciate that clients within the corporate network may typically be treated in a more trusted fashion due to physical controls that may be enforced for resources within, for example, a corporate campus. Clients accessing a corporate network from a remote location are typically required to adhere to more extensive authentication procedures because of the inability of the authenticating system to physically identify the source. Thus it is advantageous for a terminal server to identify whether a request originates from within the corporate network or using remote access in order to apply the appropriate security and authentication measures.

In some embodiments, gateway specific policies for the remote desktop connection may be enforced by sending the gateway policies to the client using the terminal server gateway protocol between the gateway and the remote client. However, this method may be vulnerable to attacks from a rogue client who can choose to ignore the terminal server gateway policies.

In one embodiment, a secure device redirection (SDR) feature may provide device redirection policy enforcement of the policies set by the gateway administrator. The device redirection feature may thus allow redirection of devices on the client machine to the terminal server. In an embodiment, the gateway may provide administrators the capability to set device redirection specific policies for clients connecting from outside the corporate network. These policies may then be sent to the client during the gateway protocol capability exchange in the remote protocol handshake sequence. The client may then have the correct policies to adhere to during the remote session.

However, since device redirection is a feature specific to the remote access protocol which may not be visible to the gateway, device redirection may be vulnerable to attack and exploitation by rogue clients. Gateways typically rely on the client's integrity to enforce the agreed upon policies. Furthermore, terminal servers may not be aware of the presence of the gateway and furthermore may not know if a client is connecting from inside the corporate network or outside of the network. This weakness can potentially be exploited by a rogue client who can choose not to abide by the gateway's policy. Thus compliance enforcement may be difficult and may further increase the risk for potential data stealth and the risk of an attack surface on the server. For example, a rogue client may be able to upload and run malicious programs on the server. Additionally, kiosk machines can allow a rogue entity to set up without the knowledge of the end user and can potentially gain access to confidential information from the server.

Thus, it would be useful to establish a communication between a gateway and a terminal server once the gateway opens the socket connection with the terminal server, but before the remote access protocol handshake between the client and the terminal server is initiated. In an embodiment, the gateway may exchange a connection request and negotiate and exchange protocol and authentication information before continuing with the connection. In one embodiment, the connection request may be a X.224 Connection Request sent from a client to the gateway server during a Connection Initiation phase. The gateway may respond with an X.224 Connection Confirm message. From this point, all subsequent data sent between the client and the gateway may be wrapped in an X.224 Data Protocol Data Unit. The client and gateway may then exchange basic connection settings. If security methods are being employed and encryption is in force then the client may generate session keys which are used to encrypt and validate the integrity of subsequent remote access traffic. For example, an encrypted 32-byte random number may be sent to the gateway, which is encrypted with the public key of the gateway. The client and gateway may then utilize the random numbers to generate session keys which are used to encrypt and validate the integrity of subsequent remote access traffic. Secure client data such as username, password, and an auto-reconnect cookie may then be sent to the gateway. Finally, the gateway may send the set of capabilities it supports to the client, and the client may respond with its capabilities.

After both the gateway and terminal server have completed the security filter handshake and the connection is secured, the gateway may instantiate a protocol prior to enabling the remote access traffic. The gateway may exchange policies with the terminal server during this initial protocol phase. By instantiating such a protocol prior to establishing the remote access protocol, those skilled in the art will appreciate that the gateway may be able to establish and enforce a redirection policy without relying on the client's integrity. The terminal server may also now be able to differentiate between connection requests from internal and external clients, which can allow terminal server administrators to establish different policies for clients internal and external to the corporate network. Furthermore, the described process may be repeated to instantiate multiple protocols prior to establishing the remote access protocol.

Those skilled in the art will appreciate that by instantiating multiple protocols in such a manner over a single connection, a remote access mechanism may be able to provide a multipurpose infrastructure with the capability to exchange various types of information between a gateway and terminal server securely before the remote protocol exchange is initiated. Such protocol exchanges may further take place while ensuring the server side enforcement of policies to counter potential attacks from rogue clients.

The above-described infrastructure for exchanging protocols may be provided while providing for backward compatibility to ensure that older clients may be supported and that the design is not client dependent. In some embodiments gateway administrators may be provided the means to allow or deny connections to older terminal servers since secure device redirection may not be supported in corporate networks that include terminal servers that do not support the infrastructure.

Those skilled in the art will further appreciate that the instantiation of two separate protocols on the same remote access port and socket connection, one preceding the other, may further allow the gateway to preserve the connection context without the need to use identifiers to identify clients. By allowing the direct exchange of policies with the terminal server, the gateway does not need to rely on the integrity of the client and may not (avoid giving computer systems human attributes) need to identify rogue clients.

Those skilled in the art will further appreciate that the above described process may enable terminal servers processes to differentiate between intranet and internet connections, or those connections originating from within the corporate network and those originating outside the corporate network. Thus terminal server administrators may set different policies for the two types of clients.

In an embodiment, the above described infrastructure may support exchanging up to 256 different types of policies between the gateway server and terminal server. Furthermore, if the terminal server protocol handler is specific to the remote access protocol, then to differentiate between the two protocols, the data packets may be encapsulated in appropriate data units to enable the handler to distinguish the protocols.

Figure 5:
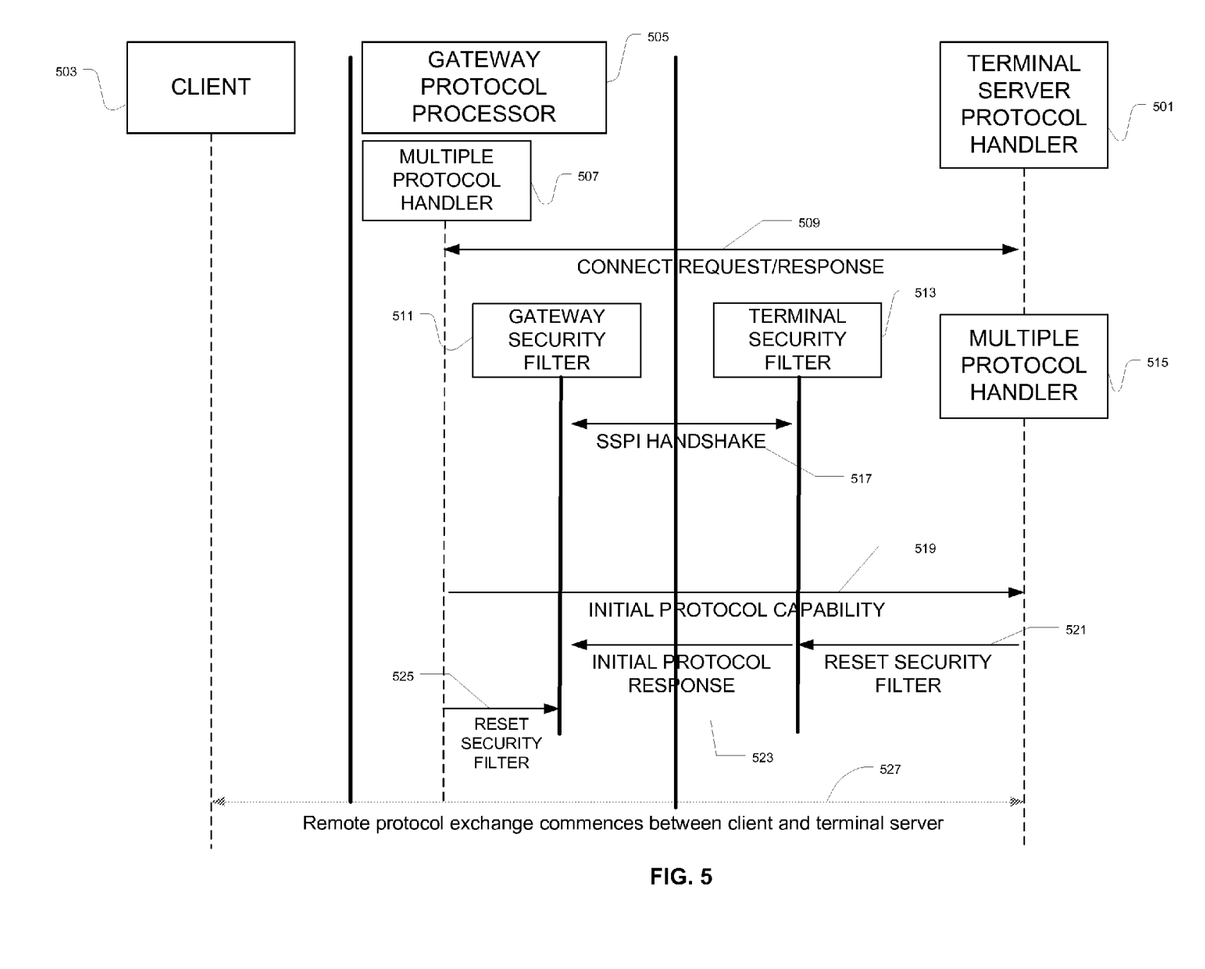
FIG. 5 illustrates an exemplary call sequence diagram.

Referring now to FIG. 5, illustrated is an exemplary multiple protocol sequence that may be used in various embodiments of the present disclosure. Initially, a client 503 may request a remote access connection to a network by making a connection request to a gateway server. In response a gateway protocol processor 505 may establish a socket connection with a terminal server. The gateway protocol processor 505 may replicate the remote access exchange by sending a connect request 509 via a pre-protocol handler 507 to a terminal server protocol handler 501 to determine the security protocol and authentication mechanism. The gateway protocol processor 505 may activate a gateway security filter 511 and initiate an SSPI handshake 517 and perform mutual authentication using SSL. Security Support Provider Interface (SSPI) is an application programming interface (API) used to perform a variety of security related operations such as authentication. CredSSP is one exemplary service available through SSPI that enables an application to delegate the user's credentials from the client (by using the client-side SSP) to the target server (through the server-side SSP). The CredSSP is also used by Terminal Services to provide single sign-on. Other means of performing security operations may be used. The terminal server protocol handler 501 may also activate its terminal security filter 513 for the exchange. The gateway protocol processor 505 may then send an initial protocol capability packet 519, which comprises a capability set, to the terminal server protocol handler 501 via the pre-protocol handler 515. The capability set is further described below.

The terminal server protocol handler 501 may send back a protocol vector response 523 in the response packet. Such a capabilities vector may include confirmation of the capabilities received in the protocol packet and is further described below. The terminal server protocol handler 501 may then reset its security filter 521. The gateway protocol processor 505 may also reset its security filter 525 when it receives the protocol response packet 523 from the terminal server protocol handler 501. At this point, the gateway protocol processor 505 may then begin transmitting remote access packets 527 from the client 503.

Figure 6:
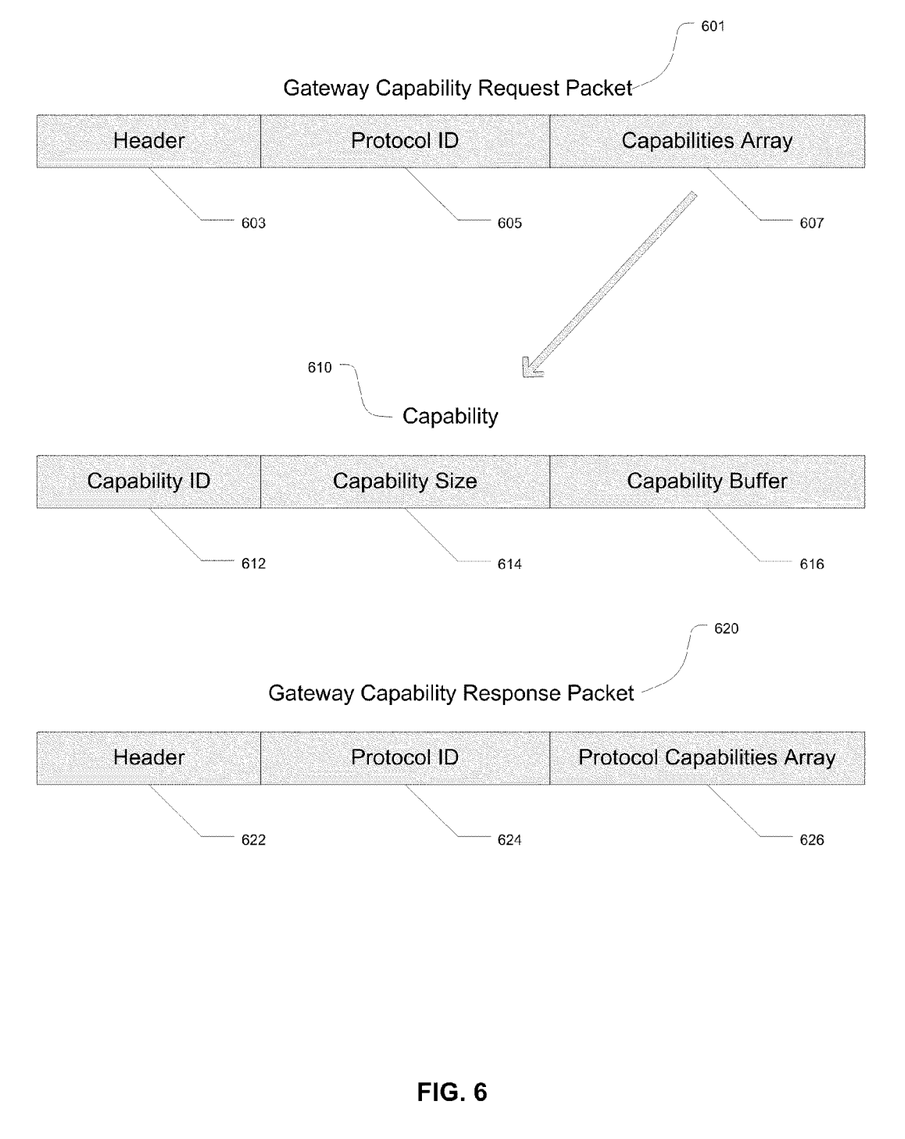
FIG. 6 illustrates exemplary data structures for practicing aspects of the present disclosure.

Referring to FIG. 6, illustrated are exemplary protocol packets that may be used in various embodiments of the present disclosure. In an embodiment, the gateway capability request packet 601 may comprise a X224 Header 603 (7 bytes), a Protocol Identifier 605 (1 byte), and the Capabilities Array 607. Each capability described by the Capabilities Array 607 may further comprise a capability ID 612 and a capability size 614 which may be followed by a capability buffer 616. The gateway capability response packet 620 may comprise a X224 Header 622 (7 bytes), a Protocol Identifier 624 (1 byte), and a Capabilities ID Array 626 (bytes=number of capabilities). The gateway capability response packet 620 may contain an array of capability ID's that have been processed at the terminal server. One byte may be allocated for each capability ID.

In one embodiment, the various components may be broken down between gateway components and terminal server components. The protocol processor's transport layer in the gateway (e.g., the socket connection handler) may be responsible for the multiple protocol exchange. Referring back to FIG. 5, the transport layer may include a multiple protocol handler 507 and a security filter 511 which may perform the multiple protocol sequence. The multiple protocol handler 507 may exchange a connection request 509, perform front end authorization, and may activate the security filter 511 to provide an encrypted connection with the server.

After completion of the initial protocol sequence, both the gateway and terminal servers may reset their security filter layer by resetting security filters 511 and 513, thus returning the terminal server to the same state as before the initial protocol exchange. By returning to the same state, the client's remote protocol exchange may not be affected by the initial protocol exchange.

In an embodiment exemplifying various aspects of the invention, the following call sequence may be used. First, the gateway may initiate an SSL connection with the terminal server and perform Kerberos based machine authentication. In this manner SSL servers and default modes may be treated alike. Once the security layer is established, the gateway may send a Connect Request to the terminal server. The terminal server may then respond with a Connect Response. Once the handshake is complete, the gateway may begin exchanging multiple protocol packets. The gateway may then send a multiple protocol policy exchange packet. The terminal server may then respond with a multiple protocol policies processed response. Once the protocol exchange is complete, the gateway may terminate the SSL connection, clean up the context parameters, and allow the client to communicate with the server. The terminal server may then reset its security filter and reset the current state in the connection handler.

Figure 7:
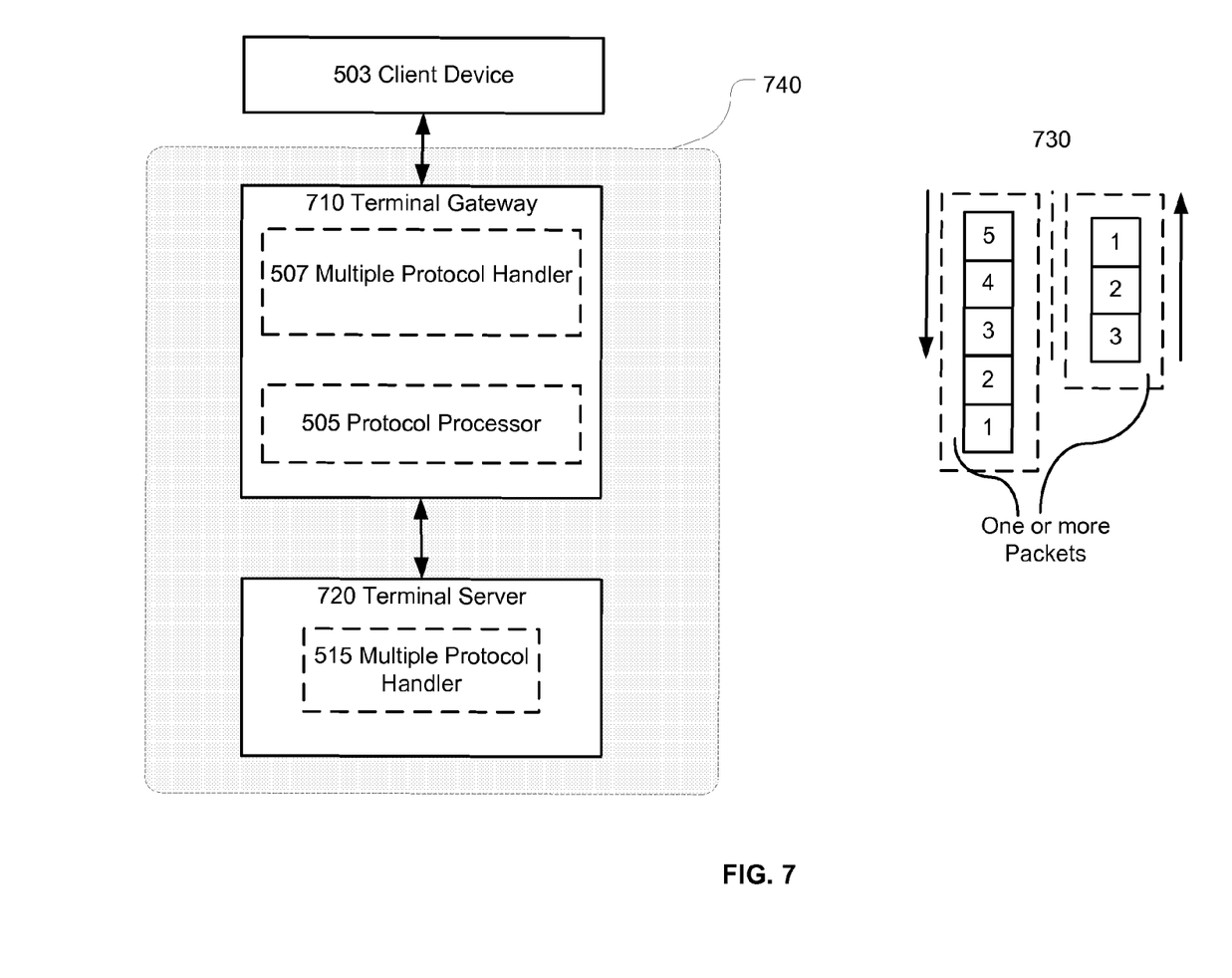
FIG. 7 illustrates an exemplary system wherein aspects of the present disclosure can be implemented.

Referring now to FIG. 7, illustrated is an exemplary diagram depicting a remote terminal session instance including sending and receiving data streams. In this example the terminal server 720 includes a pre-protocol handler 515. A terminal gateway 710 may be logically situated at the edge of a corporate network 780. Data stream 730 can be transmitted in one or more packets by a remote client device 503.

The following are a series of flowcharts depicting implementations of processes. For ease of understanding, the flowcharts are organized such that the initial flowcharts presents a high level overview and subsequent flowcharts provide further additions and/or details.

Figure 8:
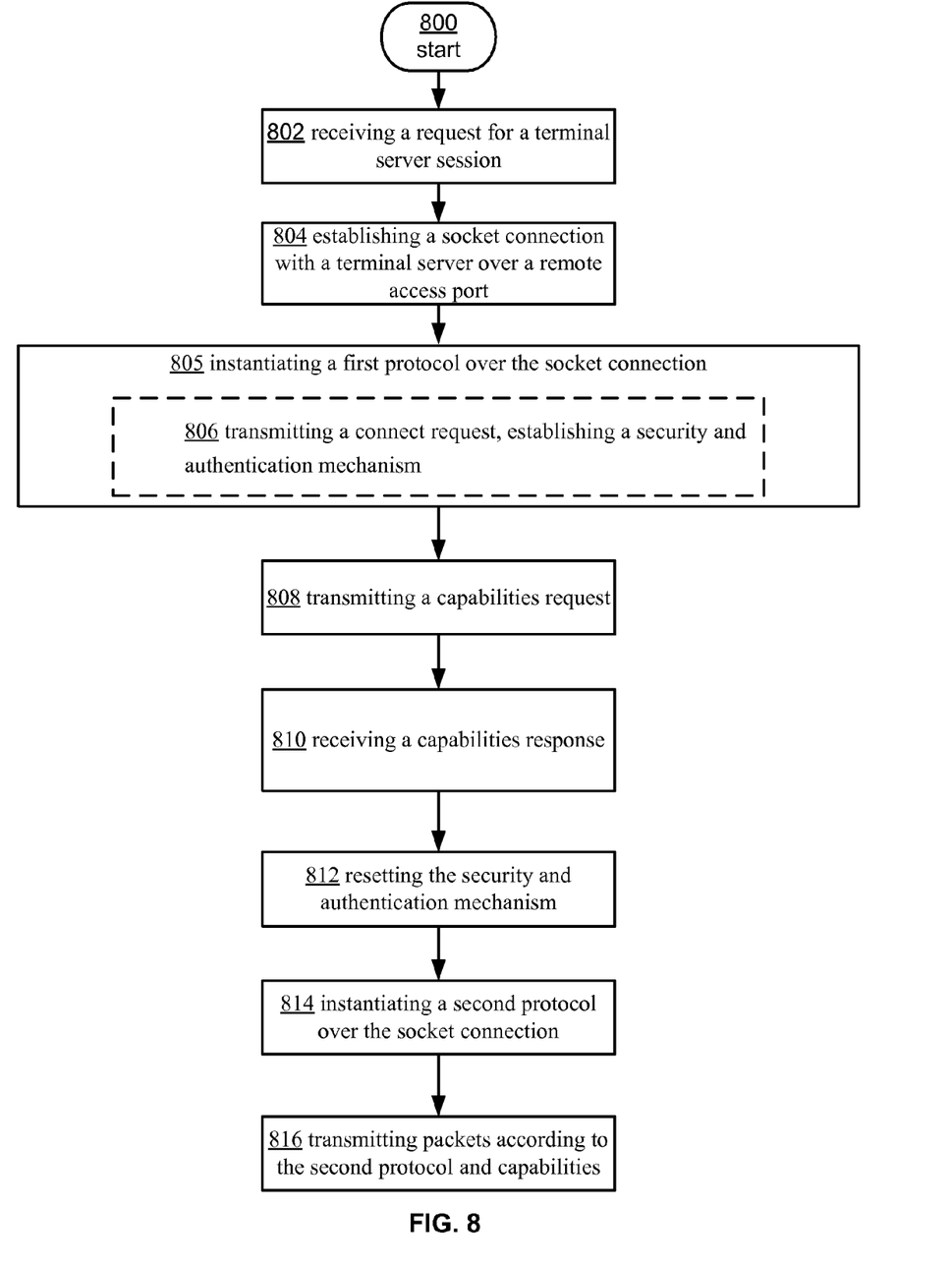
FIG. 8 illustrates an operational procedure for practicing aspects of the present disclosure.
Figure 9:
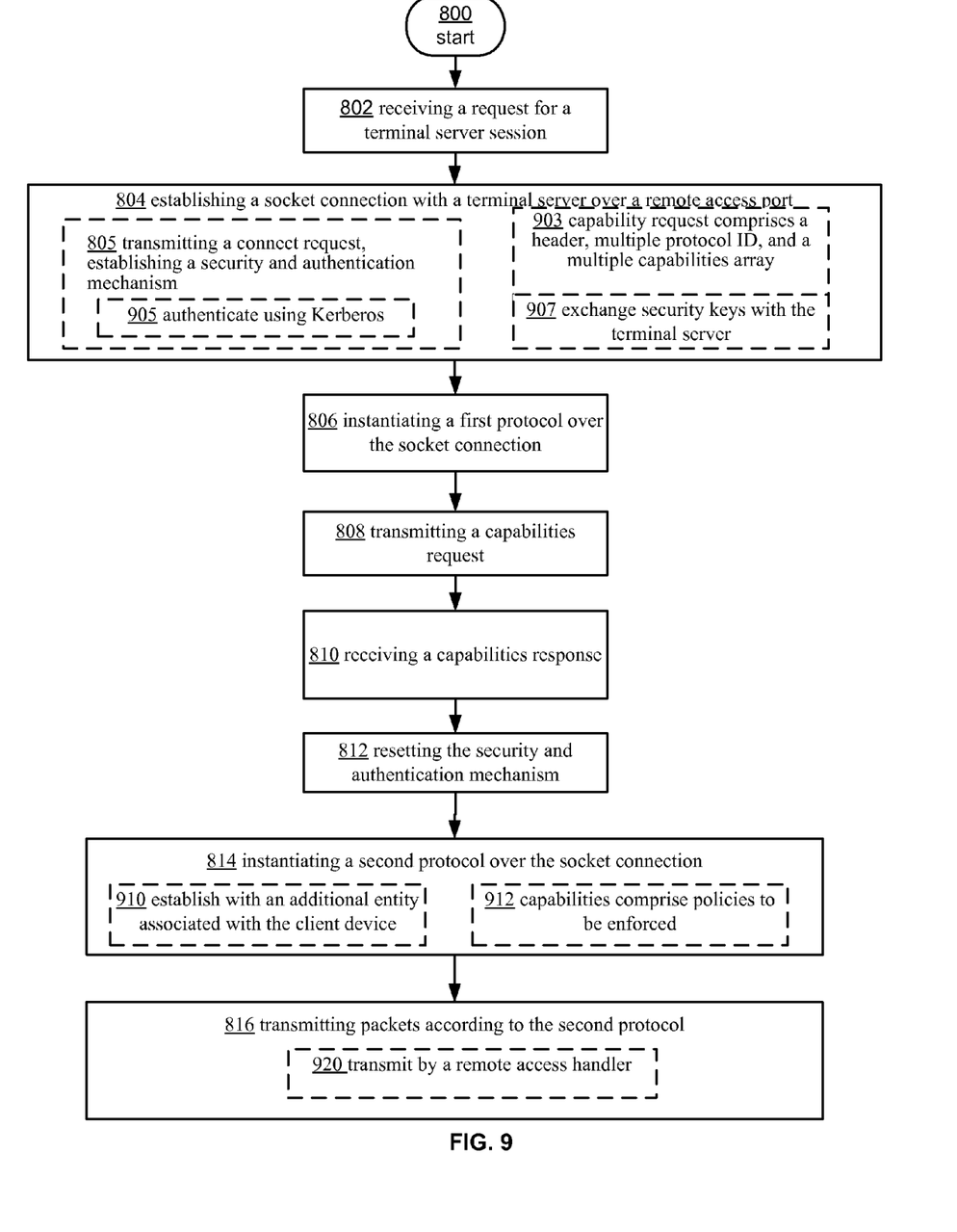
FIG. 9 illustrates an alternative embodiment of the operational procedure of FIG. 8.
Figure 10:
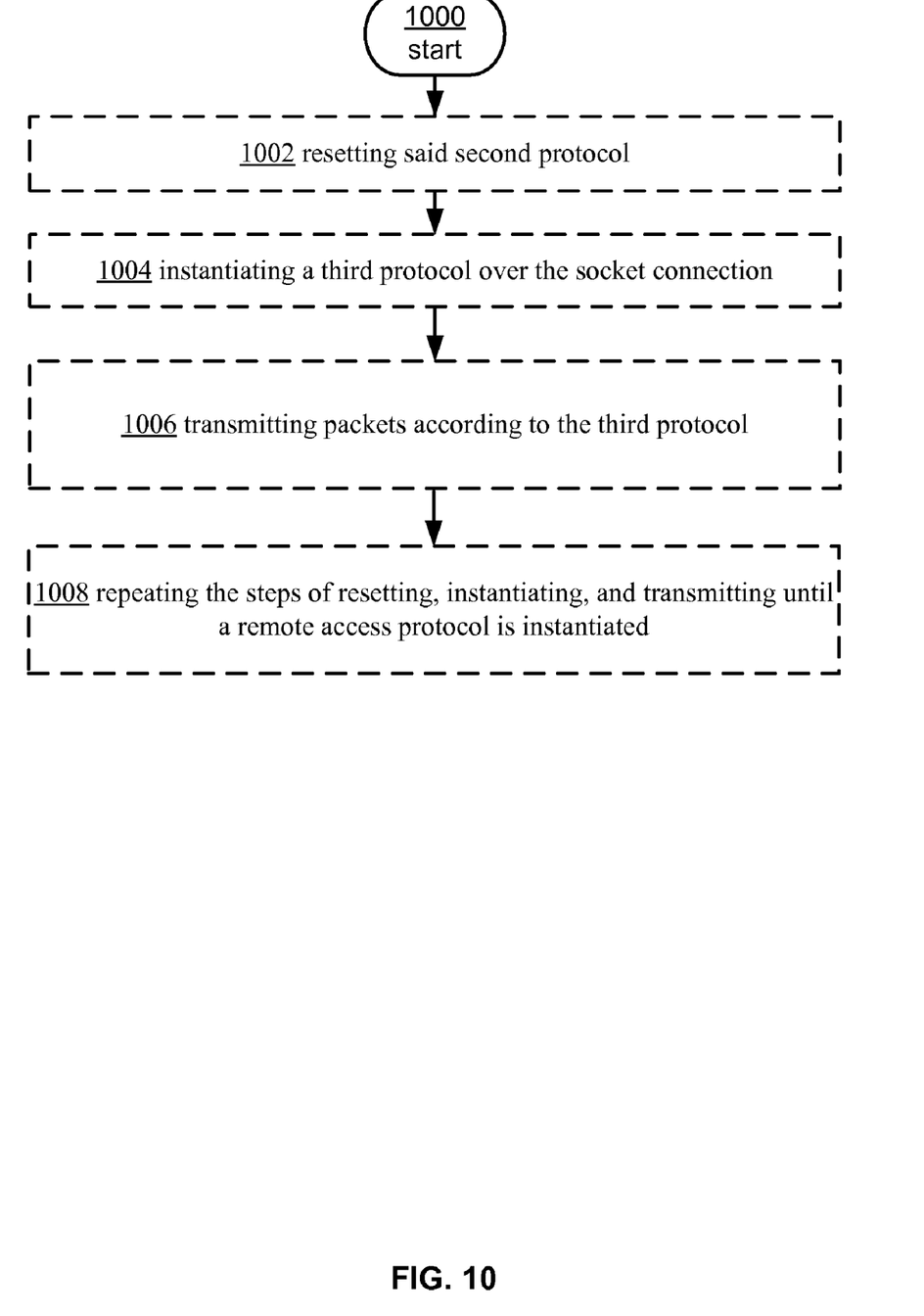
FIG. 10 illustrates an alternative additional embodiments of the operational procedure of FIG. 8.

FIGS. 8 through 10 depict an example of an operational procedure for instantiating multiple protocols over a single terminal server session including operations 800, 802, 804, 805, 806, 808, 810, 812, 814 and 816. Referring first to FIG. 8, operation 800 begins the operational procedure and operation 802 illustrates receiving a request for a terminal server session. Operation 804 illustrates establishing a socket connection with the terminal server over a remote access port. For example, a network adapter of a gateway server can be configured to receive data from a client via a network connection. For example, prior to exchanging data a server and client can establish a communication channel. A channel initialization procedure can begin when, for example, a client transmits a connection request to a server via a packet based network. A transport stack of the server can receive the request and forward the information to a session manager that can instantiate a session for the client and instantiate a remote desktop protocol stack instance to service the session. The remote desktop protocol stack instance can be configured to transmit a connection grant signal to the client. The client in this example can then be configured to transmit initialization information to the server in order to configure at least one server side virtual device such as a virtual printer driver, virtual audio driver, virtual video driver, and/or a virtual plug and play device. For example, the client can include a display that has a certain resolution. In this example the client can send a preferred resolution for the session to the server. In another example the client can include a printer of a certain type or one or more USB devices operatively coupled to the client such as digital cameras, mp3. players, etc. In this example the client can send information that identifies each device coupled to the client to the server. The server can be configured to receive the information and the server can instantiate one or more redirection drivers to support the client devices and virtual channels to route data for the virtual devices to devices operating on the client. In an example embodiment the data can be transmitted over a virtual channel of a remote desktop protocol that is established over a TCP/IP connection. Data can be also be sent from the server to the client. Typically a redirection driver communicates with a hardware component of the computer system. The redirection driver acts as a translator between the hardware component and the data source that uses it. In this example the redirection driver can be configured to route data to the client via a virtual channel over a remote desktop protocol. Once the redirection driver formats the data stream received from the data source, it can send the data to the client via the stack instance for the session.

Operation 805 illustrates the operation of instantiating a first protocol over the socket connection. For example, a gateway server may replicate the remote access exchange by sending a connect request via a pre-protocol handler to a terminal server protocol handler. Operation 806 further illustrates an additional and optional operation of transmitting a connect request, establishing a security and authentication mechanism. Operation 808 illustrates the operation of transmitting a gateway capability request packet comprising a capability set. The gateway capability request packet may comprise a Header, a Multiple Protocol Identifier, and a Multiple Capabilities Array. Each capability described by the Multiple Capabilities Array may further comprise a capability ID and a capability size which may be followed by a capability buffer.

Operation 810 illustrates the operation of receiving a gateway capability response packet comprising a capabilities process vector. The gateway capability response packet 620 may comprise a header, a multiple Protocol Identifier, and a multiple Capabilities ID Array. The gateway capability response packet may contain an array of capability ID's that have been processed at the terminal server. Operation 812 illustrates the operation of resetting the security filter and system state. After completion of the multiple protocol sequence, the gateway and terminal servers may reset their security filter layer by resetting their security filters, thus returning the terminal server to the state before the multiple protocol exchange was initiated. By returning to the same state, the client's remote protocol exchange may not be affected by the multiple protocol exchange. Operation 814 illustrates the operation of instantiating a second protocol over the socket connection. Operation 816 illustrates the operation of transmitting packets according to the second protocol.

FIG. 9 illustrates an alternative embodiment of the operational procedure 800 of FIG. 8 including additional details and refinements. As is illustrated in FIG. 9, operation 903 illustrates that the gateway capability request packet comprises a header, multiple protocol ID, and a multiple capabilities array. Operation 905 illustrates that the connection to the at least one terminal server is authenticated using Kerberos machine authentication. Kerberos is a key-based network authentication protocol that allows entities communicating over a non-secure network to authenticate their identity to one another in a secure manner. Operation 907 illustrates the operation of exchanging security keys with the terminal server. Operation 920 illustrates that the packets may be transmitted to a multiple access handler in a terminal server by a remote access handler in the gateway. Operation 912 illustrates that the capabilities exchanged in the capabilities request and response may describe the policies that are to be enforced between the client and server for subsequently established protocols. Operation 910 illustrates that additional protocols may be established with additional entities associated with the client device. With the capability to instantiate multiple protocols, additional entities on the client side as well as the server side may be able to utilize the disclosed infrastructure to exchange protocols that may be enforced between the client and server for subsequently established protocols.

FIG. 10 illustrates an alternative embodiment of the operational procedure 800 of FIG. 8 including additional details and refinements. Operation 1002 illustrates the operation of resetting the second protocol. Operation 1004 illustrates the operation of instantiating a third protocol over the socket connection. Operation 1006 illustrates the operation of transmitting packets according to the third protocol. By implementing such a series of operations a plurality of protocols may be implemented over a single socket connection. Operation 1008 thus illustrates the operation of repeating the steps of resetting, instantiating, and transmitting until a remote access protocol is instantiated.

Figure 11:
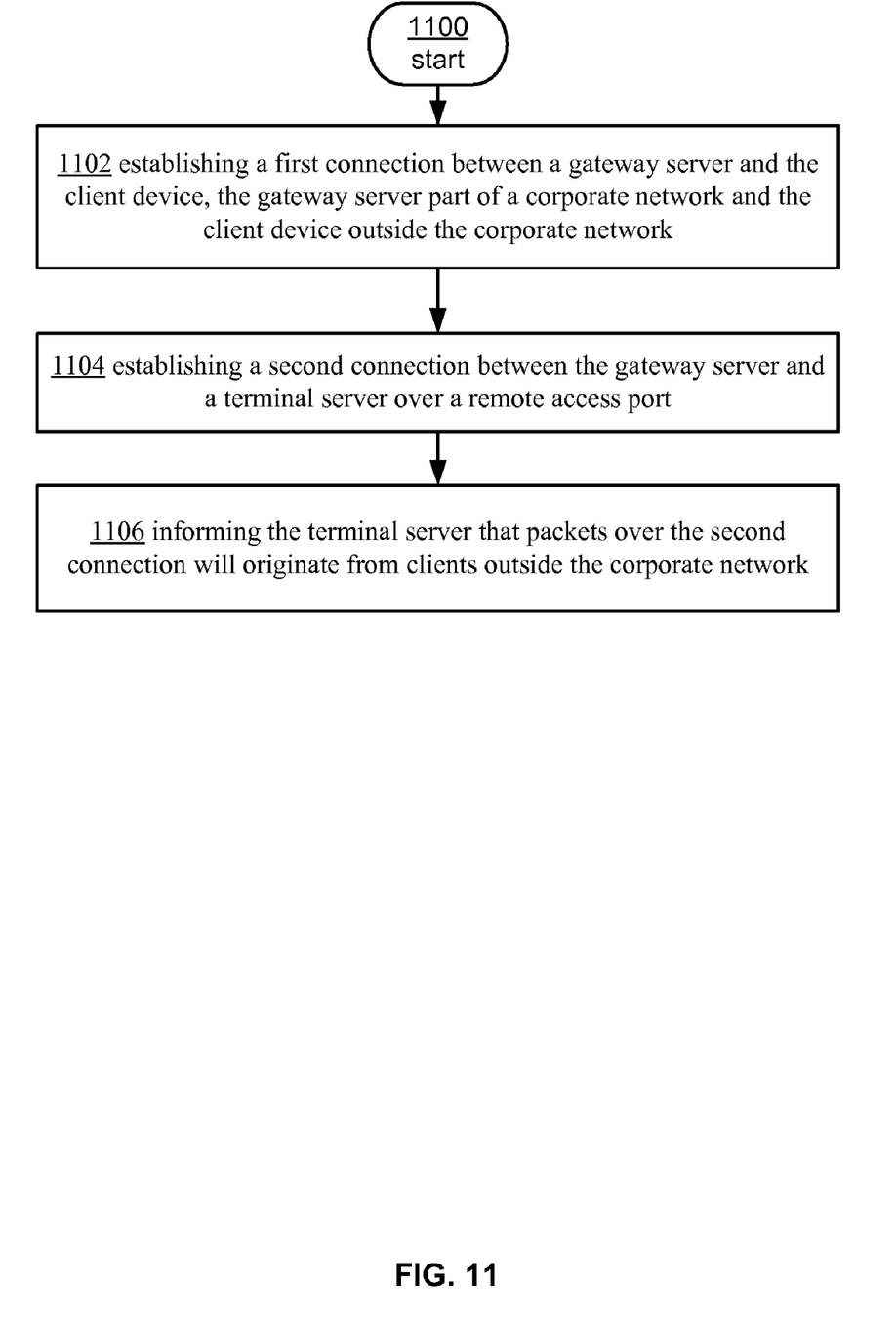
FIG. 11 illustrates an example operational procedure for practicing aspects of the present disclosure.
Figure 12:
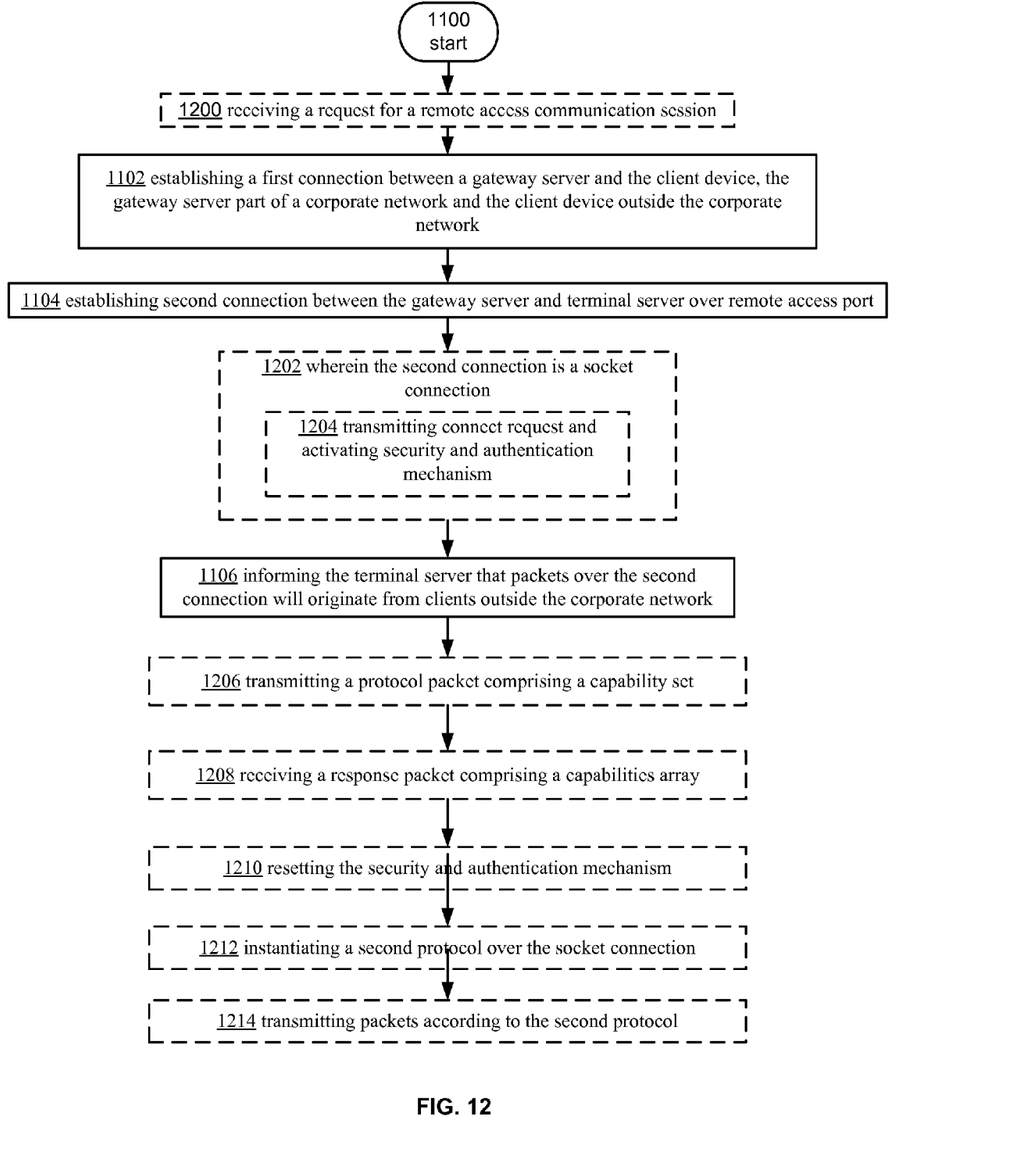
FIG. 12 illustrates an alternative embodiment to the operational procedure of FIG. 11.

FIGS. 11 and 12 depict an example of an operational procedure for implementing a remote access communication session between a client device and at least one terminal server including operations 1100, 1102, 1104, and 1106. Referring first to FIG. 11, operation 1100 begins the operational procedure and operation 1102 illustrates establishing a first connection between a gateway server and a client device, the gateway server part of a corporate network and the client device outside the corporate network. Operation 1104 illustrates the operation of establishing a second connection between the gateway server and at least one terminal server over a remote access port. For example, prior to exchanging data a server and client can establish a communication channel. A channel initialization procedure can begin when, for example, a client transmits a connection request to a server via a packet based network. A transport stack of the server can receive the request and forward the information to a session manager that can instantiate a session for the client and instantiate a remote desktop protocol stack instance to service the session. The remote desktop protocol stack instance can be configured to transmit a connection grant signal to the client. The client in this example can then be configured to transmit initialization information to the server. The server can be configured to receive the information and the server can instantiate one or more redirection drivers to support the client devices and virtual channels to route data for the virtual devices to devices operating on the client. The terminal server is typically part of the corporate network and may provide services to both internet (outside the corporate network) and intranet (inside the corporate network) clients.

Operation 1106 illustrates the operation of informing the terminal server that packets over the second connection will originate from clients outside the corporate network. As discussed above, once the client and terminal server remote protocol exchange commences, the gateway does not typically look into the encrypted exchange to verify if the client is enforcing the agreed upon policies. A rogue client can potentially bypass the established policies resulting in a potential security breach. By informing the terminal server that packets over the second connection will originate from clients outside the corporate network, the terminal server may apply the appropriate policies for the particular data exchange.

FIG. 12 illustrates an alternative embodiment of the operational procedure 1100 of FIG. 11 including additional details and refinements. Operation 1200 illustrates the operation of receiving from a client device a request for a remote access communication session. Operation 1202 illustrates that the second connection is a socket connection.

Operation 1204 illustrates the operation of transmitting a connect request and establishing a security and authentication mechanism and activating security filter. Operation 1206 illustrates the operation of transmitting a gateway capability request packet comprising a capability set. The gateway capability request packet may comprise a Header, a Multiple Protocol Identifier, and a Multiple Capabilities Array. Each capability described by the Multiple Capabilities Array may further comprise a capability ID and a capability size which may be followed by a capability buffer.

Operation 1208 illustrates the operation of receiving a gateway capability response packet comprising a capabilities process vector. The gateway capability response packet 520 may comprise a header, a multiple Protocol Identifier, and a multiple Capabilities ID Array. The gateway capability response packet may contain an array of capability IDs that have been processed at the terminal server.

Operation 1210 illustrates the operation of resetting the security and authentication mechanism, typically by resetting the security filter and system state. After completion of the multiple protocol sequence, the gateway and terminal servers may reset their security filter layer by resetting their security filters, thus returning the terminal server to the state before the multiple protocol exchange was initiated. By returning to the same state, the client's remote protocol exchange may not be affected by the multiple protocol exchange. Operation 1212 illustrates the operation of instantiating a second protocol over the socket connection. Operation 1214 illustrates the operation of transmitting packets according to the second protocol.

Figure 13:
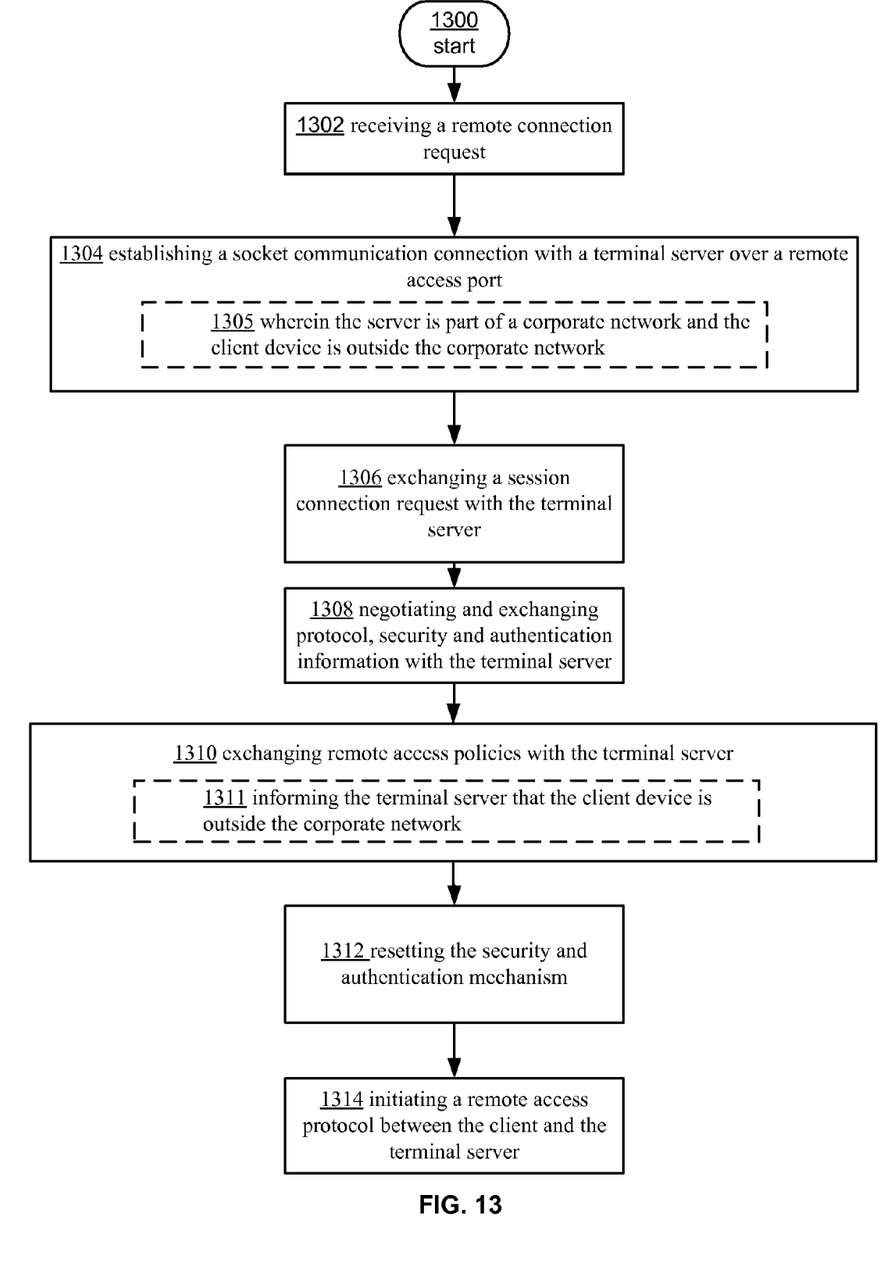
FIG. 13 illustrates an example operational procedure for practicing aspects of the present disclosure.

FIG. 13 depicts an example of an operational procedure for establishing a network policy for a client accessing a terminal server over a remote network connection including operations 1300, 1302, 1304, 1305, 1306, 1308, 1310, 1311, 1312, and 1314. Operation 1300 begins the operational procedure and operation 1302 illustrates receiving a remote connection request from a client device. Operation 1304 illustrates the operation of, in response to the remote connection request, establishing a socket communication connection with at least one terminal server over a remote access port. For example, prior to exchanging data a server and client can establish a communication channel. A channel initialization procedure can begin when, for example, a client transmits a connection request to a server via a packet based network. A transport stack of the server can receive the request and forward the information to a session manager that can instantiate a session for the client and instantiate a remote desktop protocol stack instance to service the session. The remote desktop protocol stack instance can be configured to transmit a connection grant signal to the client. The client in this example can then be configured to transmit initialization information to the server. The server can be configured to receive the information and the server can instantiate one or more redirection drivers to support the client devices and virtual channels to route data for the virtual devices to devices operating on the client.

Operation 1306 illustrates the operation of exchanging a session connection request with the terminal server. Operation 1308 illustrates the operation of negotiating and exchanging protocol and authentication information with the terminal server. Operation 1310 illustrates the operation of exchanging remote access policies with the terminal server. Operation 1312 illustrates the operation of resetting the security and authentication mechanism, typically be resetting the security filter and system state. Operation 1314 illustrates the operation of initiating a remote access protocol between the client and the at least one terminal server.

FIG. 13 further illustrates alternative embodiments of the operational procedure 1300 including additional details and refinements depicted in the operations enclosed by dashed lines as shown. Operation 1305 illustrates that the terminal server is part of a corporate network and the client device is outside the corporate network. The terminal server is typically part of the corporate network and may provide services to both internet (outside the corporate network) and intranet (inside the corporate network) clients. Operation 1311 illustrates the operation of informing the terminal server that the client device is outside the corporate network. As discussed above, once the client and terminal server remote protocol exchange commences, the gateway does not typically look into the encrypted exchange to verify whether the client is enforcing the agreed upon policies. A rogue client can thus potentially bypass the established policies resulting in a potential security breach. By informing the terminal server that packets over the second connection will originate from clients outside the corporate network, the terminal server may apply the appropriate policies for the particular data exchange.

Figure 1:
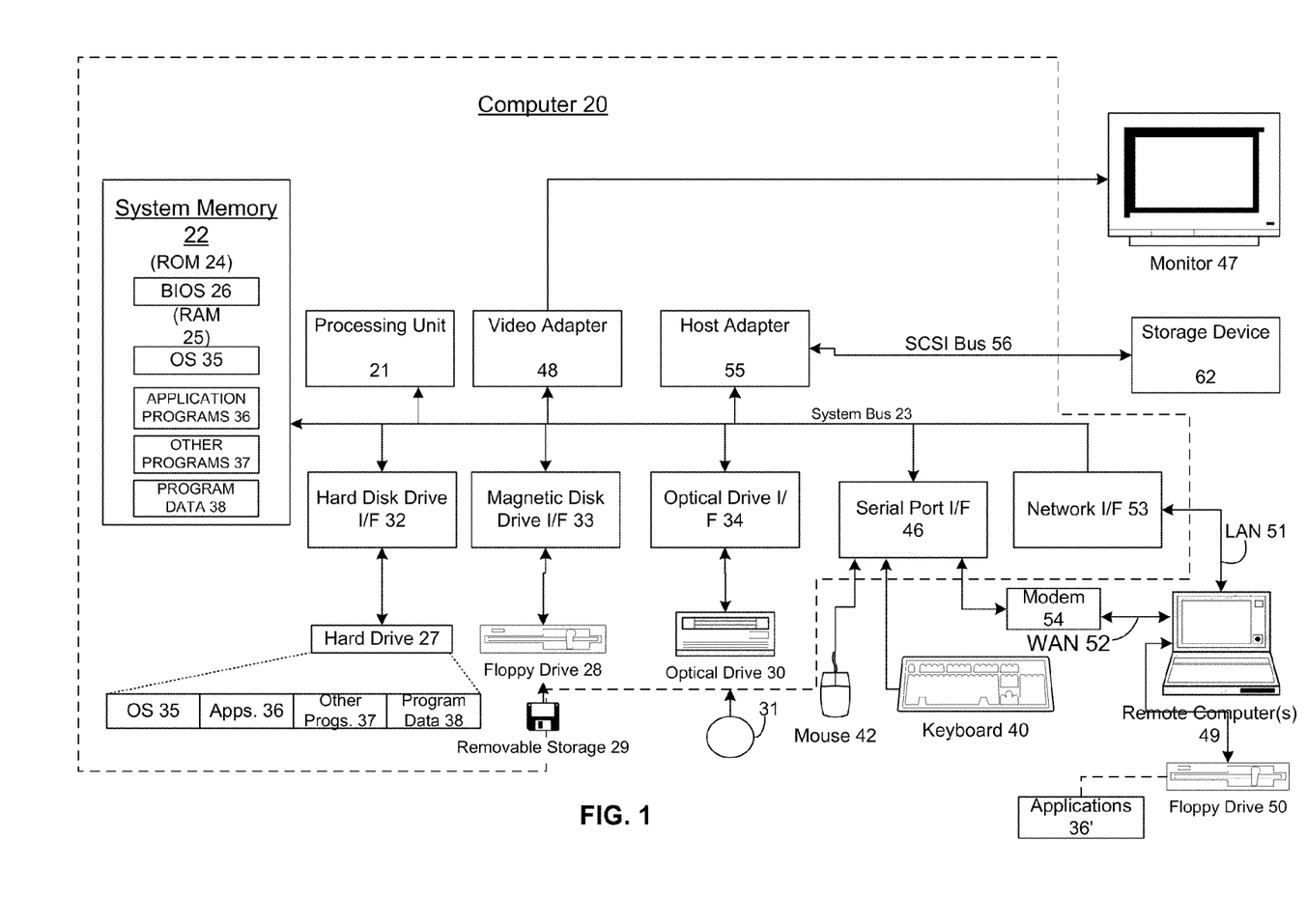
FIG. 1 depicts an example computer system wherein aspects of the present disclosure can be implemented.

As described above, aspects of the invention may execute on a programmed computer. FIG. 1 and the following discussion is intended to provide a brief description of a suitable computing environment in which the those aspects may be implemented. One skilled in the art can appreciate that the computer system of FIG. 1 can in some embodiments effectuate the server and the client of FIGS. 2-4. In these example embodiments, the server and client can include some or all of the components described in FIG. 1 and in some embodiments the server and client can each include circuitry configured to instantiate specific aspects of the present disclosure.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 1 depicts an example of a computing system which is configured to with aspects of the invention. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the invention may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the invention are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the invention described herein have been shown and described, it will be apparent to those skilled in the art that, based upon the teachings herein, changes and modifications may be made and, therefore, the appended claims are to encompass within their scope all such changes and modifications as are within the true spirit and scope of the inventions described herein.

What is claimed:

1. A method of instantiating multiple protocols over a single terminal session, comprising:
    receiving from a client device a request for a terminal server session;
    establishing a socket connection with a terminal server over a remote access port in response to receiving the request;
    instantiating a first protocol over the socket connection, further comprising establishing a security and authentication mechanism with the terminal server and transmitting a capabilities request to said terminal server after establishing the security and authentication mechanism;
    receiving from said terminal server a capabilities response in response to the capabilities request;
    resetting the established security and authentication mechanism by resetting a security filter and returning the terminal server to a security state before exchange of the capabilities request and the capabilities response while maintaining the socket connection;
    instantiating a second protocol over the socket connection after resetting the established security and authentication mechanism; and
    transmitting packets from said client device to said terminal server according to the second protocol and the capabilities response over the socket connection.

2. The method of claim 1, wherein said capabilities request comprises a header, multiple protocol ID, and a multiple capabilities array.

3. The method of claim 1, wherein said capabilities request comprise policies to be enforced when transmitting said packets.

4. The method of claim 1, wherein the socket connection to the terminal server is mutually authenticated using Credential Security Support Provider (CredSSP).

5. The method of claim 1, wherein the packets transmitted according to the second protocol are transmitted by a remote access handler.

6. The method of claim 1, further comprising resetting a server state and security context after completion of said first protocol.

7. The method of claim 1, further comprising:
    resetting said second protocol;

instantiating a third protocol over the socket connection; and transmitting packets according to the third protocol.

8. The method of claim 7, further comprising establishing additional protocols by resetting previously instantiated protocols, instantiating a subsequent protocol, and transmitting packets according to the subsequent protocol.

9. The method of claim 8, wherein, at least one of the additional protocols are exchanged with an intermediate entity.

10. A method of implementing a remote access communication session between a client device and at least one terminal server, comprising:

establishing a first connection between a gateway server and the client device, wherein the gateway server is part of a domain and the client device is outside the domain;

establishing a second connection between the gateway server and the at least one terminal server over a remote access port, wherein the at least one terminal server is part of the domain;

instantiating a first protocol over the second connection;

activating a security and authentication mechanism between the gateway server and the at least one terminal server over the second connection;

exchanging policies between the at least one terminal server and the gateway server over the second connection, wherein policies pertain to communication between the client device and the at least one terminal server;

resetting the activated security and authentication mechanism by resetting a security filter and returning the at least one terminal server to a security state before exchanging the policies while maintaining the second connection; and informing the at least one terminal server that packets over the second connection will originate from clients outside the domain.

11. The method of claim 10, further comprising receiving from a client device a request for a remote access communication session.

12. The method of claim 11, wherein the second connection is a socket connection, further comprising transmitting a connect request.

13. The method of claim 12, further comprising transmitting a protocol packet comprising a capabilities set.

14. The method of claim 13, further comprising receiving a response packet comprising a capabilities array.

15. The method of claim 14, further comprising instantiating a second protocol over the socket connection.

16. The method of claim 15, further comprising transmitting packets according to the second protocol.

17. A computing system configured to establish a network policy for a client accessing a terminal server over a remote network connection, comprising:

at least one processor; and a memory communicatively coupled to said at least one processor when said computing system is operational; said memory having stored therein computer instructions that upon execution by the at least one processor cause:

receiving a remote connection request from a client device;

establishing a socket communication connection with the terminal server over a remote access port in response to receiving the remote connection request;

sending a session connection request to the terminal server over the socket communication connection;

negotiating and exchanging protocol information, and establishing a security and authentication mechanism with the terminal server;

exchanging remote access policies with the terminal server over the socket connection after establishing the security and authentication mechanism;

resetting security and system states by resetting a security filter and returning the terminal server to a security state before exchanging the protocol information while maintaining the socket communication connection; and initiating a remote access protocol between the client and terminal server over the socket communication connection after resetting the security and system states.

18. The computing system of claim 17, wherein the terminal server is part of a domain and the client device is outside the domain, the system further configured to inform the terminal server that the client device is outside the domain.

* * * * *